H. THOMAS.
MEAT HOLDER.
APPLICATION FILED DEC. 20, 1911.
1,026,721.
Patented May 21, 1912.
3 SHEETS—SHEET 2.
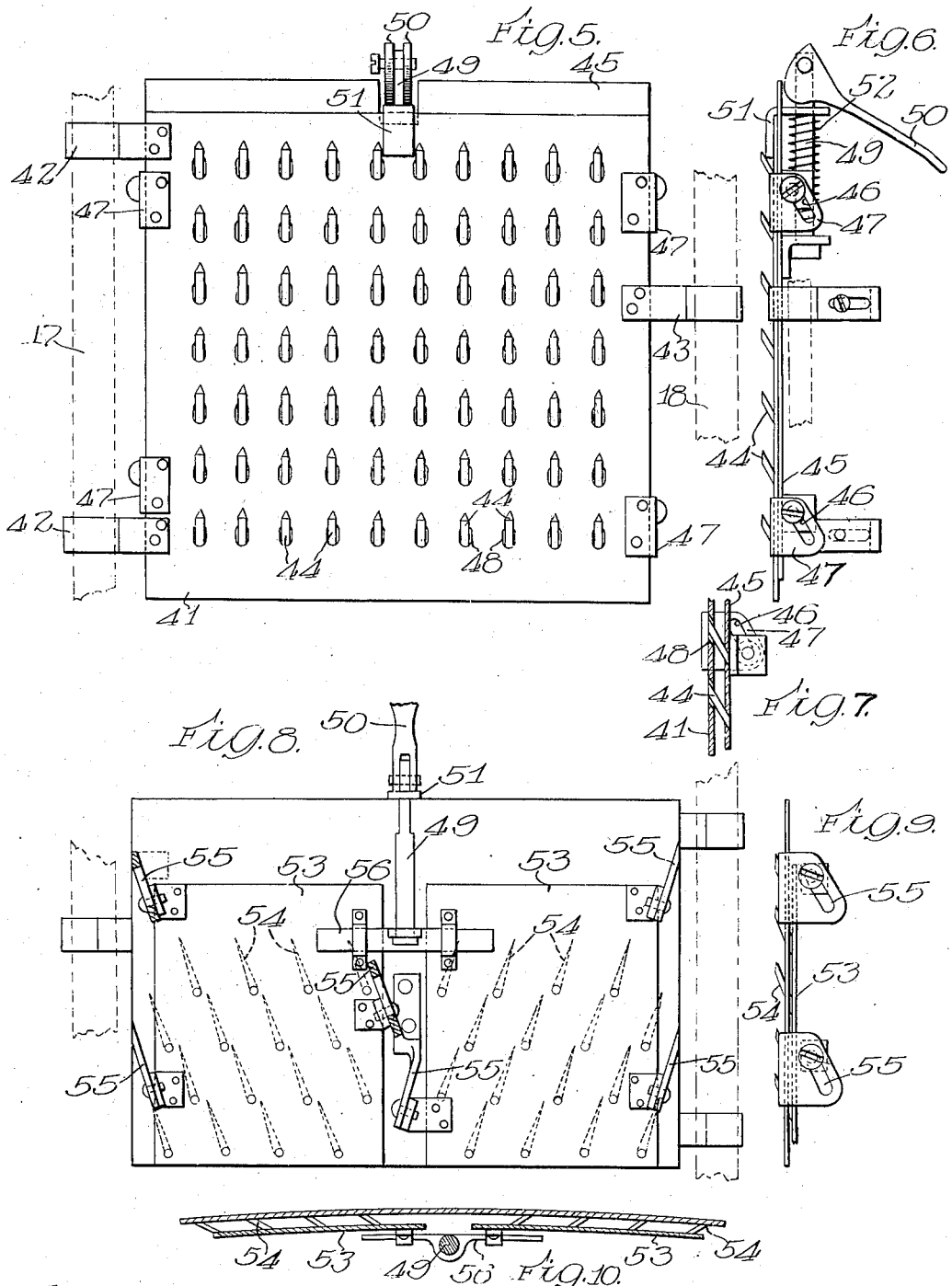
Witnesses:
Inventor:
Henry Thomas
By Brown & Hopkins
Attys

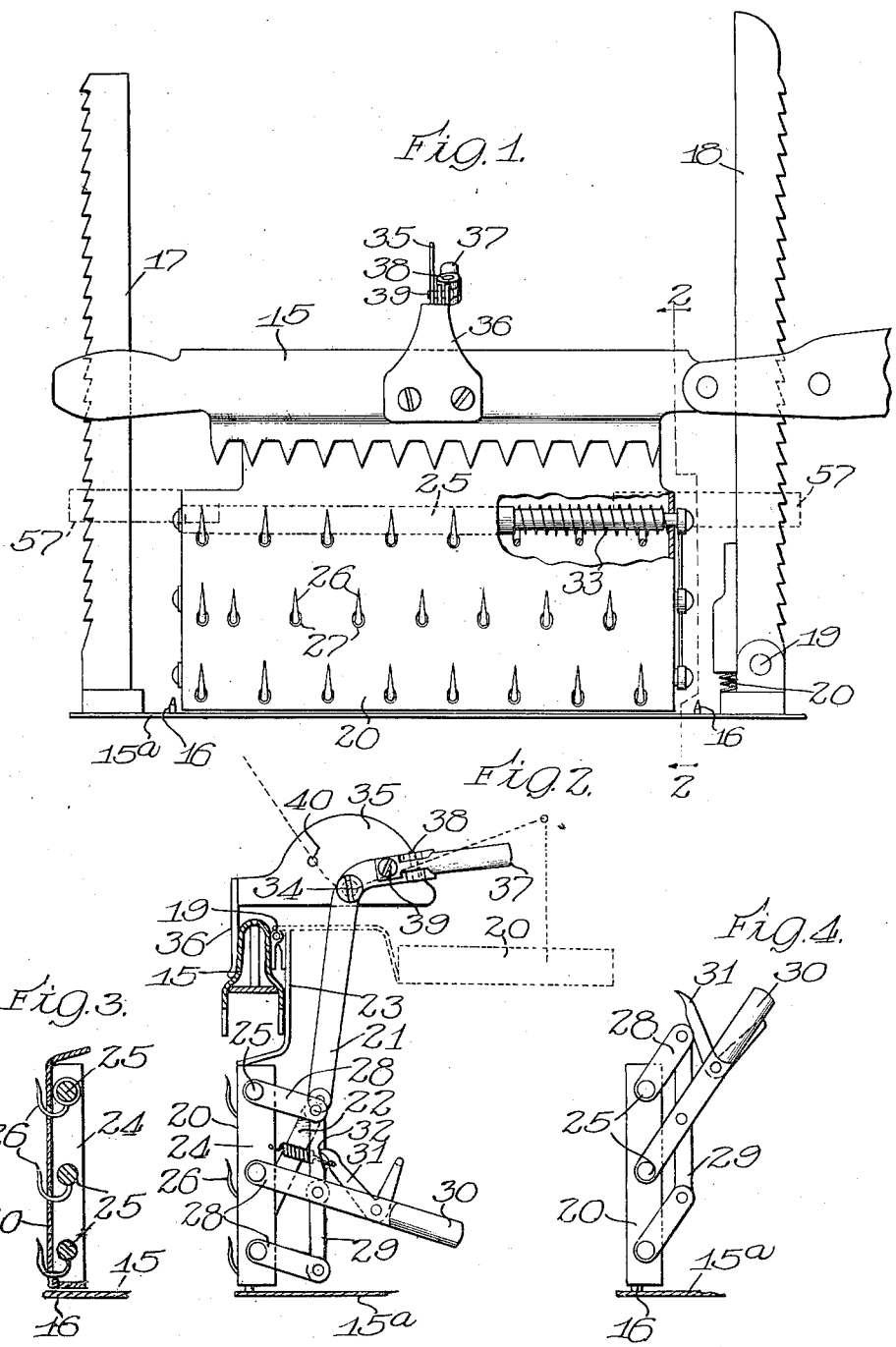

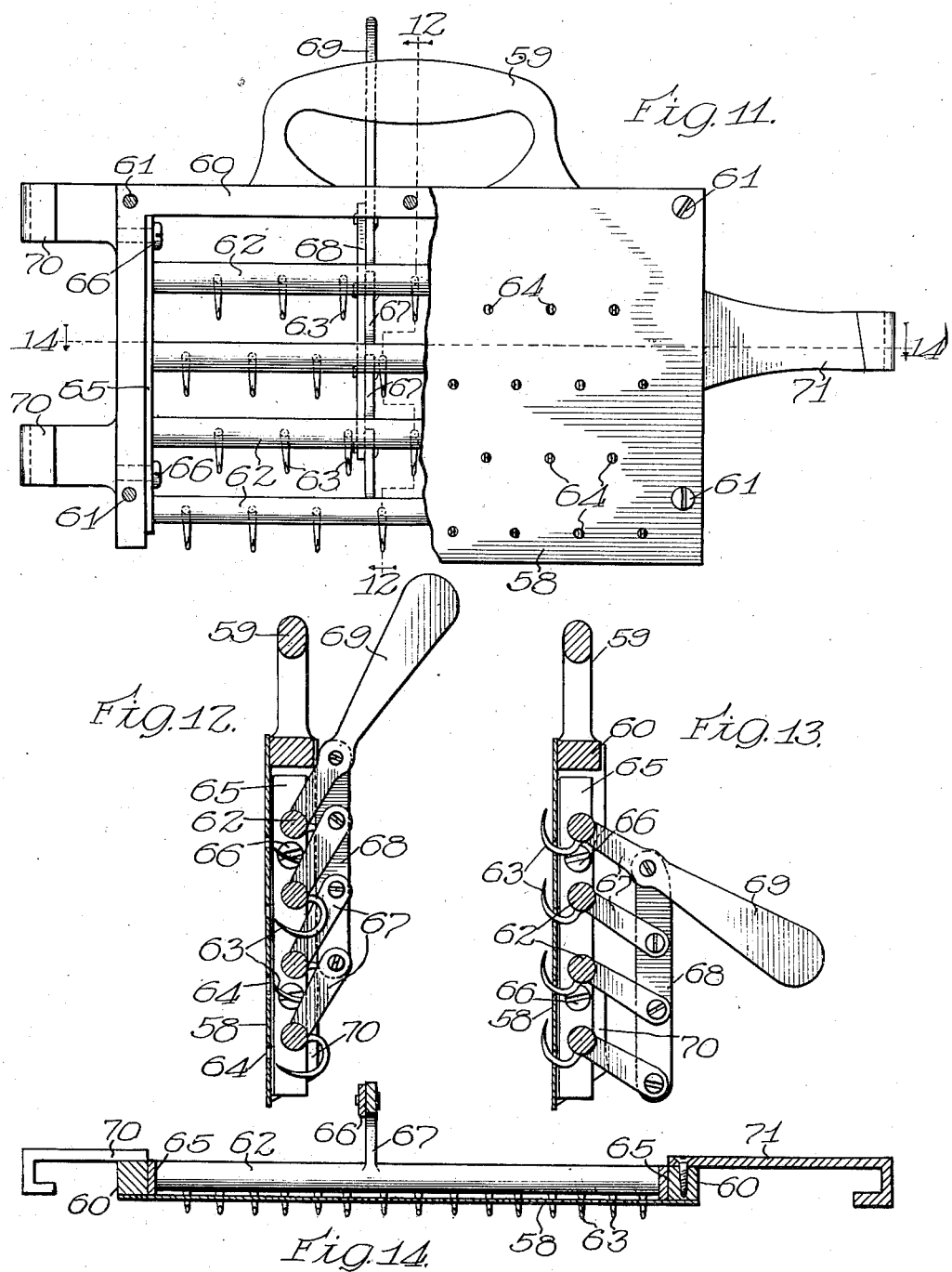

UNITED STATES PATENT OFFICE.

HENRY THOMAS, OF EAST HAM, LONDON, ENGLAND, ASSIGNOR TO U. S. SLICING MACHINE COMPANY, OF CHICAGO, ILLINOIS, A CORPORATION OF ILLINOIS.

MEAT-HOLDER.

1,026,721.     Specification of Letters Patent.     Patented May 21, 1912.

Application filed December 20, 1911. Serial No. 666,932. Substituted for application Serial No. 617,071, filed March 27, 1911.

*To all whom it may concern:*

Be it known that I, HENRY THOMAS, a subject of the King of England, residing at East Ham, London, England, have invented certain new and useful Improvements in Meat-Holders, of which the following is a specification.

This application is a substitute for my application Serial Number 617,071, filed March 27th, 1911.

This invention relates to improvements in meat holders, particularly adapted, though not necessarily limited in its use, for holding meat to be sliced by slicing machines of the type in which the meat or the like is clamped upon a table designed to be carried backwardly and forwardly in front of a rotating cutter in order that the meat may be cut into slices. In such a machine the meat is usually clamped by means of a toothed bar adjustably mounted upon vertical racks. However, owing to the nature of this clamping arrangement, considerable difficulty and inconvenience is experienced in cutting the "end" portion of the piece of meat, which end, and particularly the part directly under the clamping bar, it is impossible to cut by the machine. To overcome these difficulties and objections, and to provide an improved, simple, durable and efficient device having means whereby an "end" piece of meat may be held while being sliced and the last slice released when the whole piece has been cut up, is one of the objects of the present invention.

To the attainment of these ends and the accomplishment of other new and useful objects, as will appear, the invention consists in the features of novelty in substantially the construction, combination and arrangement of the several parts hereinafter more fully described and claimed, and shown in the accompanying drawings exemplifying the invention, and in which—

Figure 1 is a front elevation, partly broken away, of an improved device of this class constructed in accordance with the principles of this invention and showing the same as applied to or connected with a meat clamping bar; Fig. 2 is a view taken on line 2—2, Fig. 1; Fig. 3 is a vertical sectional view of a portion of Fig. 2; Fig. 4 is an end elevation of a portion of Fig. 2 showing the meat holding hooks or prongs in a retracted or released position; Fig. 5 is a front elevation of another form of holder; Fig. 6 is a side elevation thereof; Fig. 7 is a detail sectional view of a portion of Fig. 5 showing the meat holders or prongs in a retracted position; Fig. 8 is a rear elevation of another form of holder; Fig. 9 is a side elevation thereof; Fig. 10 is a sectional plan of Fig. 8; Fig. 11 is a view in elevation with parts broken away of still another form of holder; Fig. 12 is a sectional view on line 12—12 of Fig. 11. Fig. 13 is a view similar to Fig. 12 showing the meat holders or hooks in a projected position; Fig. 14 is a sectional view on line 14—14, Fig. 11.

In the forms of the invention herein illustrated, the holder comprises a plate or member and a plurality of hooks, pins or the like, which are adapted to be projected or passed through holes or slots in the said plates to penetrate the meat in such a manner as to hold the meat securely against the plate while the meat is being sliced, means being also provided whereby the hooks or pins may be withdrawn to release the meat when required. Means are also provided whereby the hooks, pins, prongs or the like, may be effectually employed with a machine wherein a table oscillates in a curved path. There is also provided means whereby the holder may be employed for holding meat to be cut by hand.

Referring more particularly to the drawings and in the form of the invention shown in Figs. 1 to 4, the numeral 15 designates the clamping bar usually employed in meat slicing machines of this type for clamping the meat upon the table 15ª projecting above the surface of which table, are a plurality of spikes or pins 16 which penetrate the meat and which coöperate with the clamping bar to hold the meat rigidly in position. The clamping bar 15 coöperates or moves upon the upright ratcheted guides 18 in a manner well known in this art, and one of these guides, the guide 18 is pivotally supported as at 19 and an elastic member 20 coöperates with the guide 18 to move the guide about its pivot 19 in one direction to hold the clamping bar in position, and to permit the clamping bar to be adjusted when the guide is moved in the opposite direction upon its pivot.

Hinged to the clamping bar 15, preferably by means of a hinge 19, is a plate 20, which, when the clamping bar is in use to clamp the meat, usually occupies a horizontal plane, as shown in dotted lines in Fig. 2, but which, when it is desired to cut an "end" piece of meat, is lowered into a vertical plane, as shown in full lines in Fig. 2, by means of a lever 21 and a link connection 22, the horizontal and vertical positions of the plate being determined by suitable catches. The plate 20 is connected to the bar 15 by means of an arm or extension 23 which is so shaped that the face of the plate 20 when arranged in the position shown in full lines in Fig. 2, will be beneath the clamping bar 15 and between it and the table or support 15$^a$.

At the back of the plate 20 and mounted thereon, preferably by means of rearwardly deflected flanges 24, are a number of rods or spindles 25 capable of oscillating in horizontal planes, and each of these rods or spindles 25, in the present exemplification of the invention, carries a series of pointed or sharpened hooks 26, which in their normal positions, are situated with their points flush with or below the surface of the plate 20, and which, when the rods or spindles are partially turned, project through holes or perforations 27 in the plate 20 so that their points are upwardly directed. These rods or spindles are moved by means of arms 28 arranged thereon and are connected together by means of a link 29, and are moved by means of a hand lever 30 into an operative or inoperative position, and the operative position of the hooks 26 are determined by a trigger catch 31 upon the lever 30 which co-operates with a notch or shoulder 32 preferably on the link 29.

Any suitable means may be provided which tends normally to retract the hooks 26, and for this purpose an elastic member 33 (see Fig. 1) preferably in the form of a spring, is provided, and this spring is coiled about one of the spindles or rods 25 and is connected thereto in such a manner that it will tend normally to retract the spindles and move the parts to the position shown in Fig. 4 when the catch 31 is released.

With this form of the device in operation, the end piece of meat to be sliced is placed against the face of the plate 20 when the latter is in its vertical position and the hooks withdrawn. The hooks are then projected through the openings 27 in the plate until they penetrate the meat to about the depth of the last slice, whereupon the meat is ready for cutting. These hooks are preferably arranged with their points extending upwardly and being thus arranged, will obviate the danger of the meat being dragged therefrom, or will reduce such danger to a minimum. Although the hooks in the present exemplification of the invention are described as projecting upwardly when in use, it will be manifest they may be arranged to project in any other direction. When all but the last slice is cut and clear from the plate, the said last slice may be removed by simply withdrawing the hooks by means of the hand lever 30.

In order to insure that the plate 20 will be held rigidly when in use, it is provided with two or more sockets in its bottom edge (see particularly Fig. 3) designed to fit over two of the spikes or pins 16 on the table or support 15. Obviously any other means may be employed for holding the plate rigid.

The plate 20 is adapted to be swung about its pivot or hinge 19 by means of the lever 21 which lever is pivotally connected as at 34 (see particularly Fig. 2) to a plate 35 which latter is connected as at 36 with the clamping bar 15. The lever 21 is provided with a handle 37 which is pivoted as at 38 intermediate its ends and is provided on one end with a hand gripping portion and on its other end with a laterally projecting locking pin 39, which latter is adapted to engage in either one of two holes 40, and to hold the lever 21 in its two extreme positions, that is, in the position shown in full lines, and also diagrammatically in dotted lines in Fig. 2.

Referring now to the forms of the invention shown in Figs. 5, 6 and 7, the plate 41 may be mounted upon the usual clamping bar or upon the usual vertical racks 17, 18 in any convenient manner, such for example, as by means of sockets 42, 43, and the holding devices are in the form of pins 44, angularly disposed and carried upon a back plate 45, normally maintained slightly toward the rear of the face plate 41 and parallel thereto. The back plate 45 is slidably mounted in correspondingly inclined slots 46 formed in the lugs 47 mounted upon the face plate 41, so that when the back plate is raised relatively to the face plate, the former at the same time moves forwardly toward the face plate 41 to project the pins 44 through holes or apertures 48 in the face plate, the pins projecting in an upward direction. The raising of the back plate 45 may be accomplished in any suitable manner, but preferably by means of a connection 49, and a cam lever 50 mounted upon the back plate and operating against a suitable fixed part 51 on the plate 41. An elastic member 52 serves to keep the parts in either position. If desired, the pins instead of being straight may be curved in a similar manner to that shown in Figs. 1 to 3, the guide 46 being correspondingly formed to impart the desired direction of motion.

Although the forms of invention already described are adapted for use in machines making a straight cut, it may be equally well adapted to machines for making a curved cut by bending the face plate and the spindles upon which the hooks or pins are carried. In Figs. 8, 9 and 10, there is shown such a form which is adapted to machines wherein the table oscillates in a curved path. In this form, the back plate is made in two parts 53, each of which parts carry a set of pins 54 projecting upwardly and somewhat laterally so that as they are projected into the meat, they tend to thereby stretch the same and thereby take a firmer hold. The said back plates 53 are mounted in suitable guides 55 and are also operated in a manner similar to the back plates shown in Figs. 5 and 6, that is, by means of the connection 49 and the cam lever 50, but in this form of the invention the connection 49 is connected to a bar 56, which couples the plates 53 together.

Although the invention as shown in Figs. 1 to 4 is applied to the usual clamping bar 15, it will be understood that it may be formed separately and provided with suitable sockets 57, which are formed on the plate 20 and adapted to fit over the upright rack members 17, 18 of the machine. Further in some cases, where desired, the device may be utilized for holding a piece of meat or the like while being cut by hand, independently of the machine, and such a device is shown in Figs. 11 to 14 of the drawings. In this form, the plate 58 is provided with a handle 59, the latter being preferably formed upon a frame 60 to which the plate 58 is removably attached by fastening devices 61. The spindles 62 are provided with hooks 63 similar to the hooks 26, and they pass through apertures or openings 64 in the plate 58. The ends of these spindles 52 are preferably journaled in bearing members 65, and the spindles and members are arranged within the frame 60 in the rear of the plate 58. The spindles and members 65 are removably secured in position by means of fastening devices 66 passing therethrough and engaging a portion of the frame. Each of the spindles is provided with an arm or extension 67 connected thereto and by means of which the spindles are rotated to project or retract the hooks 63. In order that the spindles may be simultaneously rotated, the projections 67 are connected by means of a link member 68, and one of the projections 67 is formed into an operating handle 69. It will thus be seen that when the handle 69 is operated, the spindle 62 will be rotated in one direction or the other according to the direction of movement of the handle with the result that the hooks 63 will be either projected or retracted with respect to the face of the plate 58. In use, this form of the device may be held adjacent the meat by one hand grasping the handle 59, while with the other hand, the handle 69 may be operated to project the hooks 63 so that they will penetrate the meat. If desired, this form of holder may be provided with sockets 70, 71, into which the upright rack members 17, 18 project thereby enabling the operator to employ this form of device either for cutting meat by hand, or in connection with a meat slicing machine.

Obviously, the details of construction of this device may be varied considerably, and it is therefore not desired that this application be restricted in this respect, and although the invention has been described as applied to machines in which the meat or the like is clamped upon a table adapted to be reciprocated with respect to the knife, it will be understood that it may be equally well applied to machines in which the table is stationary, or in which no clamping bar is employed. It is also obvious that the manner of projecting and retracting the pins may be changed as well as the manner of mounting the spindles and pins with respect to the plate with relation to which the pins are adapted to be projected and retracted.

While in the specification and claims of this application the term "face plate" has been employed to designate the element against which the meat is clamped or drawn by the prongs, it is to be understood that this term is used in the broadest sense and is intended to include any abutment or rest with which the meat has engagement.

What is claimed as new is:

1. A device of the class described embodying a surface adjacent which the meat is arranged, meat holding prongs coöperating with the said surface and adapted to be projected outwardly and beyond the plane of such surface into engagement with the meat and to be retracted, and means for thus projecting and retracting the prongs.

2. A device of the class described embodying a support for the meat, a supplemental support adjacent which latter the meat is placed, and meat holding prongs connected with the supplemental support and adapted to be projected outwardly beyond the face thereof and retracted with respect to the surface and into and out of engagement with the meat.

3. A device of the class described embodying a support for the meat, a supplemental support adjacent which latter the meat is placed, and meat holding means connected with the supplemental support and adapted to be projected outwardly beyond and retracted with respect to the face of the latter and into and out of engagement with the meat, said meat holding means when thus projected penetrating the meat.

4. A device of the class described embodying a support for the meat, a supplemental support adjacent which latter the meat is placed, meat holding means connected with the supplemental support and adapted to be projected and retracted with respect to the latter and into and out of engagement with the meat, and means for locking said meat holding means when thus projected.

5. A device of the class described embodying a support for the meat, a supplemental support adjacent which latter the meat is placed, meat holding means coöperating with the supplemental support and adapted to be projected and retracted with respect to the latter, and means tending normally to thus retract the said meat holding means.

6. In a device of the class described, the combination of a face plate, means for holding the plate in position for use, and means adapted to be adjusted at will and with respect to the said plate to be projected outwardly from the face of the plate and retracted into and out of engagement with the meat.

7. In a device of the class described, the combination of a face plate, means for holding the plate in position for use, means adapted to be projected with respect to the said plate into and out of engagement with the meat and mechanism for controlling the last said means at will, the second recited means operating to hold the meat against the plate.

8. In a device of the class described, the combination of a face plate mounted for ready movement into and out of position for use, means for holding the plate in position for use, means adapted to be projected with respect to the said plate into and out of engagement with the meat, the last said means operating to hold the meat against the plate, and mechanism for controlling the second recited means at will.

9. In an apparatus for holding material to be sliced, the combination with a support for holding the article to be sliced, of a face plate mounted upon the support for ready adjustment into and out of operative position with respect thereto, and means for coöperating with the face plate for holding the material to be sliced against the face of the said face plate.

10. In an apparatus for holding material to be sliced, the combination with a support, of a face plate pivoted to the support upon a horizontal axis and arranged to be moved into and out of a vertical operative position, and means for holding the material to be sliced against the face of the said plate.

11. In an apparatus for holding the material to be sliced, the combination with a support, of a face plate pivoted to the support upon a horizontal axis and arranged to be moved into and out of operative position, and means adapted to be projected beyond the face of the face plate and into engagement with the material to be sliced for holding the material against the face of the plate.

12. In an apparatus for holding the material to be sliced, the combination with a support, of a face plate mounted upon the support and adapted to be readily moved into and out of operative position, means adapted to be projected and retracted with respect to the face of the face plate to hold the material to be cut and for releasing said material, and mechanism for controlling the last said means at will.

13. In an apparatus for holding material to be sliced, the combination with a support, of a face plate mounted upon the support and adapted to be moved into and out of operative position, means adapted to be projected and retracted with respect to the face of the face plate, to hold the material to be cut and for releasing said material, means for controlling the last said means at will, said holding means penetrating the material and operating to draw the material against the face of the plate.

14. In an apparatus for holding meat or the like while being sliced, the combination of an abutment, a plurality of prongs, and mechanism for projecting said prongs at will and with respect to the said abutment into the meat in such a manner as to hold the meat against the abutment.

15. In an apparatus for holding meat or the like while being sliced, the combination of a face plate, a plurality of prongs, means whereby said prongs may be projected at will and with respect to the plate into the meat in such a manner as to hold the meat against the plate, and means tending normally to withdraw the prongs with respect to the face plate.

16. In an apparatus for holding meat or the like while being sliced, the combination of a support for the meat, a face plate, a plurality of prongs, means whereby said prongs may be projected with respect to the face plate into the meat in such a manner as to hold the meat against the plate, and means for locking the prongs in their projected position with respect to the face plate.

17. In an apparatus for holding meat or the like while being sliced, the combination of a perforated face plate, means for supporting said plate, a plurality of prongs disposed at the rear of said plate, means for projecting said prongs through the face plate into the meat and for withdrawing the said prongs therefrom, and means for locking said prongs in the projected position.

18. In an apparatus for holding meat or the like while being sliced, the combination of a perforated face plate pivotally mounted upon a support, means for securing said plate in operative and inoperative positions, one or more prongs disposed at the rear of the said face plate, means for projecting said prongs through the face plate into the meat and for withdrawing said prongs therefrom, and means for locking said prongs in the projected position.

19. In an apparatus for holding meat or the like while being sliced, the combination of a face plate mounted upon a support and adapted to be readily adjusted into operative and inoperative positions, one or more prongs disposed adjacent said plate, and mechanism for projecting said prongs with respect to the plate into the meat and for withdrawing said prongs therefrom.

20. In an apparatus for holding meat or the like while being sliced, the combination of a face plate mounted upon a support and adapted to be adjusted into operative and inoperative positions, one or more prongs disposed adjacent said plate, means for projecting said prongs with respect to the plate into the meat and for withdrawing said prongs therefrom, and means for locking said prongs in the projected position.

21. In an apparatus for holding meat or the like while being sliced, the combination of a face plate, means for supporting said face plate, a series of pivotal rods supported adjacent said plate, one or more hooks upon said rods, means for oscillating said rods to project the hooks with respect to the plate into the meat and for withdrawing said hooks therefrom, and means for maintaining said hooks in the projected position.

22. In an apparatus for holding meat or the like while being sliced, the combination of a face plate pivotally mounted upon a support, means for securing said plate in operative and inoperative positions, a series of pivotal rods carried with said plate, one or more hooks upon said rods, means for oscillating said rods to project the hooks with respect to the plate into the meat and for withdrawing the hooks therefrom, and means for maintaining the hooks in the projected position.

23. The combination with a meat support, and a supporting device operatively connected therewith, of a perforated face plate connected to said supporting device, means for securing the said face plate in operative and inoperative positions with relation to the said meat support, a series of prongs, means for projecting the said prongs through the perforations of the face plate to engage the end portion of the meat, and means for locking the prongs in their projected position.

24. The combination with a meat support and a supporting device operatively connected therewith, of a perforated face plate pivotally supported upon the said supporting device, a bell crank lever carried by the said supporting device, means for connecting the said bell crank lever to the face plate, means for securing the said lever so as to hold the said plate in operative and inoperative positions, a plurality of prongs disposed at the rear of said face plate, means for projecting the said prongs through the said face plate into the meat and for withdrawing said prongs therefrom, and means for locking the said prongs in their projected position.

25. The combination of a meat support and a meat holder coöperating therewith, said holder embodying a support adapted to be arranged uprightly with respect to the first said support, and means carried by the second recited support and adapted to be projected at will and with respect thereto and into engagement with the meat.

26. The combination of a meat support and a meat holder coöperating therewith, said holder embodying a support adapted to be arranged uprightly with respect to the first said support, and means carried by the second recited support and adapted to be projected with respect thereto and into engagement with the meat, the last said means penetrating the meat and operating to draw the meat against the support.

27. The combination of a meat support and a meat holder coöperating therewith, said holder embodying a support adapted to be arranged uprightly with respect to the first said support, means carried by the second recited support and adapted to be projected at will and with respect thereto and into engagement with the meat, and means for maintaining the said holder in an operative position.

In testimony whereof I have signed my name to this specification, in the presence of two subscribing witnesses, on this fifth day of December A. D. 1911.

HENRY THOMAS.

Witnesses:
 E. CUEMANT,
 A. SCOTT.

DISCLAIMER.

1,026,721.—*Henry Thomas*, East Ham, London, England. MEAT HOLDER. Patent dated May 21, 1912. Disclaimer filed March 8, 1926, by the assignee, *U. S. Slicing Machine Company*.

Hereby enters this disclaimer to the said claims 9, 12, and 13 in said specification, which claims are in the following words, to wit:

"9. In an apparatus for holding material to be sliced, the combination with a support for holding the article to be sliced, of a face plate mounted upon the support for ready adjustment into and out of operative position with respect thereto, and means for cooperating with the face plate for holding the material to be sliced against the face of the said face plate.

"12. In an apparatus for holding the material to be sliced, the combination with a support, of a face plate mounted upon the support and adapted to be readily moved into and out of operative position, means adapted to be projected and retracted with respect to the face of the face plate to hold the material to be cut and for releasing said material, and mechanism for controlling the last said means at will.

"13. In an apparatus for holding material to be sliced, the combination with a support, of a face plate mounted upon the support and adapted to be moved into and out of operative position, means adapted to be projected and retracted with respect to the face of the face plate, to hold the material to be cut and for releasing said material, means for controlling the last said means at will, said holding means penetrating the material and operating to draw the material against the face of the plate."

[*Official Gazette March 23, 1926.*]